J. C. GILLESPIE.
MARKER FOR CORN PLANTERS.
APPLICATION FILED MAR. 11, 1914.
1,101,627.
Patented June 30, 1914.
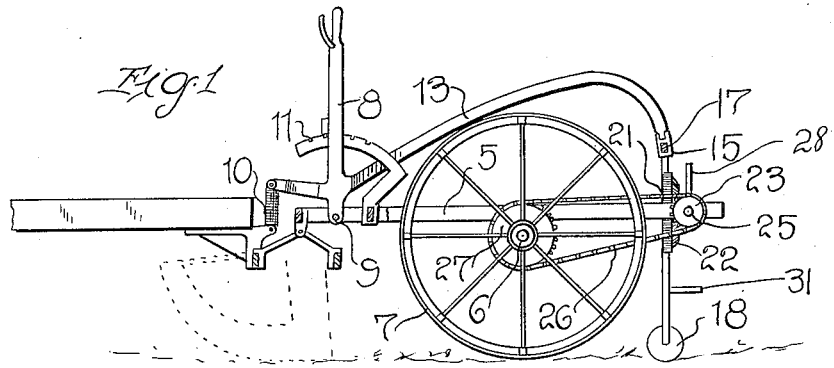
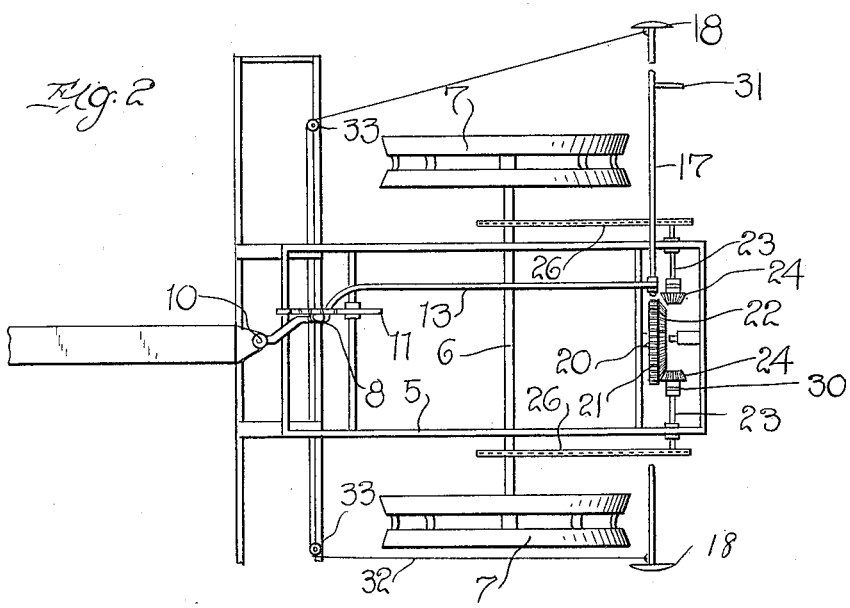
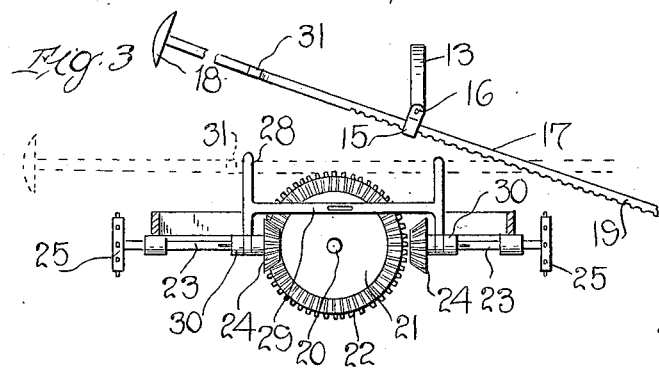
Inventor
J.C. GILLESPIE

UNITED STATES PATENT OFFICE.

JOHN C. GILLESPIE, OF LOSTANT, ILLINOIS.

MARKER FOR CORN-PLANTERS.

1,101,627.  Specification of Letters Patent.  Patented June 30, 1914.

Application filed March 11, 1914. Serial No. 824,016.

*To all whom it may concern:*

Be it known that I, JOHN C. GILLESPIE, citizen of the United States, residing at Lostant, in the county of La Salle and State of Illinois, have invented certain new and useful Improvements in Markers for Corn-Planters, of which the following is a specification, reference being had to the accompanying drawings.

This invention relates to an improved marker for corn planters and similar agricultural machines and has for its primary object to provide improved means for easily and quickly positioning the marker foot or blade upon either side of the machine, when the same is turned at the end of the field.

The invention has for another and more particular object to provide improved means for mounting the marker arm including a bar fulcrumed intermediate of its ends and connected to a lever for lifting the front or runner frame to elevate the planting boots out of the ground, a driven gear, a marker arm mounted in said bar and provided with rack teeth which are engaged with said gear when the lever is shifted to elevate the planting boots, and driving gears arranged upon opposite sides of the driven gear and automatically shifted alternately into engagement therewith as the marker is moved from one side to the other of the machine.

The invention has for a further general object to improve and simplify the construction of devices of the above character whereby the operator is relieved of considerable manual labor and the durability and efficiency of such machines in operation greatly increased.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a corn planter provided with my improved marker; Fig. 2 is a top plan view thereof; Fig. 3 is an end view thereof.

Referring in detail to the drawing, 5 designates a frame preferably of rectangular form which is loosely supported for vertical tilting movement upon a wheel axle 6. Upon opposite ends of this wheel axle, the ground wheels 7 are mounted.

8 indicates a lever which is fulcrumed as at 9 upon the main frame of the machine. This lever is connected in the usual manner as indicated at 10 to the forward runner carrying frame, and is provided with a locking dog for engagement with the teeth of a rack segment 11. The lower pivotally mounted end of the lever 8 is provided with a bar 13 which is fixed or integrally formed at one of its ends upon said lever. The rear end of the bar 13 is curved downwardly as shown and upon the same a collar 15 is pivotally mounted as at 16. In this collar the marker arm or rod 17 is slidably mounted and is provided upon its opposite ends with marker blades or disks indicated at 18. It will be noted that this rod 17 is provided upon its lower side with a longitudinal series of rack teeth 19 the purpose of which will be later fully explained. Upon a stub shaft or arbor 20 mounted in the rear end of the machine frame, a peripherally toothed gear 21 is journaled. This gear is also provided with an annular series of teeth 22 upon its rear face.

23 designates a pair of alined transversely disposed shafts mounted in suitable bearings on the frame the inner ends of said shafts being provided with pinions 24 adapted to mesh with the teeth 22 upon the face of the gear 20 at diametrically opposite points. These pinions are keyed upon the respective shafts 23 for sliding movement. Upon the outer ends of each of the shafts 23 a sprocket wheel 25 is fixed and is connected by a chain 26 to a larger sprocket wheel 27 secured upon the wheel shaft 6 adjacent each end thereof. Thus, in the movement of the machine over the field, rotation is constantly being transmitted to the shafts 23.

29 designates a transversely disposed lever having arms 28 formed upon its ends and each provided at its extremity with a yoke for engagement with a collar 30, provided upon the respective gears 24.

From the foregoing description of the construction and arrangement of the several parts, the operation of the device will be understood as follows: Assuming that the operator is driving across the field with the marker extending upon the right hand side of the machine, when the end of the field is reached, the lever 8 is shifted to oscillate the frame 5 and lift the seed depositing boots out of the ground. This movement of the lever 8 lowers the rearwardly extending bar 13, said bar in turn forcing the inner end of the marker arm or rod 17 downwardly so that its teeth will engage upon the peripheral teeth of the gear 21. In the turning movement of the machine, the left hand pinion 24 being engaged with the teeth 22 on the face of the gear 21, said gear is rotated to shift the marker rod 17 to the left, and thus extend the blade 18 from the left hand side of the machine so that when the movement of the lever 8 is reversed, and the rod 13 moved upwardly, the marker will be forced downwardly into engagement with the ground. It will be understood, that in this shifting movement of the marker rod 17, when the same reaches its extreme position, a projection 31 on the right hand end thereof will engage with the trip lever 28 and move the same to shift the left hand pinion 24 out of engagement with the gear 21 and the right hand pinion 24 into engagement with the teeth 22 on said gear. In this manner, it will be seen that the direction of rotation of the gear 21 is automatically reversed so that when the opposite end of the field is reached, and the rod or arm 17 again lowered into engagement with the peripheral teeth of said gear, it will be shifted to the opposite side of the machine in the manner above explained. To the opposite ends of the marker arm 17, the ends of a wire or cable 32 are secured. This cable passes around guide sheaves or rollers 33 mounted upon the transversely disposed hopper carrying frame adjacent the opposite ends thereof. This cable is provided for the purpose of relieving the marker arm of undue strain as it is moved transversely by the shifting mechanism above described.

From the foregoing description taken in connection with the accompanying drawings, it is thought that the construction, manner of operation and several advantages of my invention will be clearly and fully understood. By the provision of automatic means for shifting the marker arm, the operator can give his entire attention to the driving of the team and the elevation of the planter boots. It will be appreciated that by means of my invention, he is thus relieved of considerable labor.

Having thus described the invention, what is claimed is:

1. The combination with a planting machine including a frame mounted for vertical tilting movement and a lever to actuate the same, of a transversely shiftable marker arm, a bar connected to said lever and extending rearwardly therefrom, a support for said arm mounted upon said bar, and means positively operated from the wheel axle of the machine to shift said arm transversely in either direction and extend the marker from opposite sides thereof.

2. The combination with a planting machine including a frame and a wheel axle upon which said frame is mounted for vertical tilting movement, a lever for tilting said frame, of a rearwardly extending bar connected to said lever, a transversely shiftable marker arm, a support for said arm mounted upon the rear end of said bar, said arm being provided with rack teeth, a gear wheel mounted upon the machine frame, the teeth on said arm being disposed in engagement with the teeth of said gear when the lever is shifted to tilt the machine frame, and independently shiftable pinions driven from the wheel axle and alternately shifted into and out of driving engagement with said gear in the shifting movement of the marker to opposite sides of the machine whereby the rotation of said gear is reversed, to reverse the movement of the marker arm upon a subsequent engagement of the teeth thereon with said gear.

3. The combination with a planting machine including a wheel axle, a frame loosely mounted thereon, a lever for tilting said frame, of a rearwardly extending bar fixed to said lever, a transversely shiftable marker arm mounted upon the rear end of said bar, a gear mounted upon the machine frame, spaced transverse shafts mounted in the frame and driven from the wheel axle, pinions keyed upon said shafts, and a lever mounted upon the frame and connected to said pinions to shift the same, said marker arm being provided with rack teeth adapted for engagement with the teeth of said gear when the lever is shifted in one direction whereby the marker arm is moved to the opposite side of said frame, the marker on one end of said arm being adapted to engage the lever connected to said pinions and shift the pinions in opposite directions upon their respective shafts and alternately engage the same with said gear to reverse the rotation of the latter.

4. The combination with a planting machine including a wheel axle, and a frame loosely mounted thereon, a lever for tilting said frame, of a rearwardly extending bar fixed to said lever, a support pivotally mounted in said bar, a transversely movable marker arm mounted in said support and provided with rack teeth, a gear mounted upon the machine frame, spaced transverse shafts mounted in the frame, driving connections between said shafts and the wheel axle, pinions keyed upon said shafts, said gear being provided with peripheral teeth for engagement by the rack teeth on the marker arm and having teeth on one face for engagement by said pinions at diametrically opposite points, and a pivotally mounted lever connected to said pinions, whereby, when the frame tilting lever is shifted, said marker arm is lowered to engage the rack teeth thereof with the peripheral teeth of the gear and shift said arm to the opposite side of the machine, the marker on said arm engaging said last named lever to shift one of the pinions out of engagement with said gear and the other pinion into engagement with the same, whereby the direction of rotation of the gear is reversed, so that the movement of the marker arm is reversed when the same is subsequently lowered.

5. The combination with a planting machine including a frame mounted for vertical tilting movement and a lever to actuate the same, of a transversely shiftable marker arm, a bar connected to said lever and extending rearwardly therefrom, a support for said arm mounted upon said bar, a flexible element connected to opposite ends of the rod, guides for said element on the machine frame, and means positively operated from the wheel axle of the machine to shift said arm transversely in either direction and extend the marker upon opposite sides thereof.

6. The combination with a planting machine including a frame mounted for vertical tilting movement and a lever to actuate the same, of a transversely shiftable marker arm, a bar connected to said lever and extending rearwardly therefrom, a support for said arm mounted upon said bar, a flexible element secured at its ends to the opposite ends of said arm, spaced guide rollers for said flexible element mounted upon the machine frame, and means to shift said arm transversely in either direction and extend the marker upon opposite sides of the machine.

In testimony whereof I hereunto affix my signature in the presence of two witnesses.

JOHN C. GILLESPIE.

Witnesses:
HENRY SHAWBACK,
GUY L. BARBER.

Copies of this patent may be obtained for five cents each, by addressing the "Commissioner of Patents, Washington, D. C."